United States Patent
Leathers

(10) Patent No.: US 7,044,214 B2
(45) Date of Patent: May 16, 2006

(54) AIRCRAFT GROUND SUPPORT AIR CONDITIONING UNIT WITH COOLING AIR FLOW CONTROL DOORS

(75) Inventor: Thomas M. Leathers, Granger, IN (US)

(73) Assignee: Honeywell International, Inc., Morristown, NJ (US)

( * ) Notice: Subject to any disclaimer, the term of this patent is extended or adjusted under 35 U.S.C. 154(b) by 154 days.

(21) Appl. No.: 10/354,773

(22) Filed: Jan. 30, 2003

(65) Prior Publication Data
US 2004/0149427 A1    Aug. 5, 2004

(51) Int. Cl.
G05D 23/00    (2006.01)
B60H 1/00    (2006.01)

(52) U.S. Cl. ............... 165/299; 165/203; 454/267; 62/172; 62/401

(58) Field of Classification Search ........... 165/202, 165/203, 41, 299; 62/172, 183, 401, 402, 62/87; 454/267
See application file for complete search history.

(56) References Cited

U.S. PATENT DOCUMENTS

| | | | |
|---|---|---|---|
| 2,161,312 A | 6/1939 | Pritchard | |
| 2,767,561 A * | 10/1956 | Seeger | 62/87 |
| 3,217,790 A | 11/1965 | Wasson et al. | |
| 3,323,584 A | 6/1967 | Serratto | |
| 3,938,348 A | 2/1976 | Rickert | |
| 3,994,335 A | 11/1976 | Perkins | |
| 4,374,469 A * | 2/1983 | Rannenberg | 62/402 |
| 4,445,342 A * | 5/1984 | Warner | 62/172 |
| 4,495,986 A * | 1/1985 | Clark et al. | 454/267 |
| 5,135,161 A * | 8/1992 | Goodman | 236/13 |
| 6,058,715 A * | 5/2000 | Strang et al. | 62/402 |
| 6,085,834 A | 7/2000 | Thomas et al. | |
| 6,189,324 B1 * | 2/2001 | Williams et al. | 62/402 |
| 6,637,215 B1 * | 10/2003 | Leathers | 62/401 |
| 6,751,979 B1 * | 6/2004 | Leathers | 62/401 |

* cited by examiner

Primary Examiner—Ljiljana Ciric
(74) Attorney, Agent, or Firm—Ingrassia Fisher & Lorenz

(57) ABSTRACT

A system and method of supplying conditioned air to an aircraft environmental control system during ground support operations that uses at least one flow control door to control the flow of cooling air through a heat exchanger. The heat exchanger removes heat from a flow of compressed air supplied to the system. The temperature of the conditioned compressed air is controlled by selectively positioning the flow control door, which regulates cooling air flow through the heat exchanger.

25 Claims, 4 Drawing Sheets

AIRCRAFT GROUND SUPPORT AIR CONDITIONING UNIT WITH COOLING AIR FLOW CONTROL DOORS

FIELD OF THE INVENTION

The present invention relates to environmental control systems for aircraft and, more particularly, to a modular air conditioning ground unit for supplying conditioned air to an aircraft environmental control system during ground support operations.

BACKGROUND OF THE INVENTION

Aircraft main engines not only provide propulsion for the aircraft, but in many instances may also be used to drive various other rotating components such as, for example, generators and pumps. The main engines may also be used to supply compressed air to the aircraft's environmental control system, which may be used to supply temperature-controlled air to both the aircraft cabin and to electronic equipment within the aircraft.

When an aircraft is on the ground and its main engines are not being used, an alternative power source may be used to supply power for ground support operations. In addition, during some ground support operations, an external supply of cooling and heating air may be used to supply temperature-controlled air to the cabin and aircraft equipment. For some type of aircraft ground support applications, most notably military aircraft ground support applications, a ground cart may be used to supply electrical power to the aircraft and compressed air to an air conditioning system module. The air conditioning module in turn may supply temperature-controlled air to the aircraft cabin and the aircraft's electronic equipment.

One particular air conditioning system module that may be used during aircraft ground support operations receives high temperature (e.g., ≧300° F.) compressed air supplied by the ground cart, and conditions the compressed air to a predetermined temperature. The air conditioning system module may be used in at least two modes, a cooling mode, to supply cool air, or a heating mode, to supply warm air. To do so, the air conditioning system module may include a primary heat exchanger, a condenser, a moisture separator, and one or more cooling turbines. Typically, this air conditioning system module is designed so that when it is operating in the cooling mode it will supply cool air at a predetermined desired temperature for a given, predetermined design ambient temperature. For example, the system may be designed to supply cooling air at a temperature no higher than 55° F. when the ambient temperature is 125° F. Thus, when actual ambient temperature is below the design ambient temperature, the air conditioning system may supply cooling air that is less than 55° F.

In some instances, supplying air to an aircraft at less than 55° F. may not be desirable. Moreover, in some instances, it may be desirable to supply heating air to an aircraft at temperatures of up to 200° F. Hence, the air conditioning system module may include a bypass flowpath for use in the heating mode. The bypass flowpath allows a portion of the high temperature compressed air to flow around the primary heat exchanger, and back into the cooled compressed air stream that is exhausted from the primary heat exchanger. For example, a valve may be installed in a bypass duct, and the valve may be positioned to control hot compressed air bypass flow rate, to thereby control the temperature exiting the primary heat exchanger, and in turn controlling the temperature of the air being supplied by the air conditioning system module.

Although the above-described system and method for controlling air temperature to an aircraft during ground support operations, in both a cooling mode and a heating mode is effective, it suffers certain drawbacks. For example, it can be difficult to consistently control the temperature of the air by feeding a portion of the hot compressed air back into the compressed air that has been cooled. In addition, the cost of the air conditioning system module may be increased because high temperature ductwork and a high temperature valve may be needed to implement the compressed air bypass flow path.

Hence, there is a need for a system and method of providing conditioned air to an aircraft environmental control system during ground support operations that does not use hot compressed air to control air supply temperature when ambient temperature is below the maximum design temperature and/or is less costly than presently known systems and methods. The present invention addresses one or more of these needs.

SUMMARY OF THE INVENTION

The present invention provides a system and method of supplying conditioned air to an aircraft environmental control system during ground support operations that is simple, efficient, and does not adversely affect system costs.

In one embodiment, and by way of example only, a temperature-controlled air supply system for use with an aircraft on the ground and for connection to a compressed air source includes a primary air flow passage, a first heat exchanger, and an inlet door. The primary air flow passage has an inlet port and an outlet port. The inlet port is coupled to receive a flow of primary air. The first heat exchanger has at least a first fluid flow path and a second fluid flow path. The first fluid flow path is fluidly coupled in series with the primary air flow passage, and the second flow path is coupled to receive a flow of compressed air from the compressed air source. The first heat exchanger is adapted to transfer heat from the compressed air to the primary air and to supply conditioned compressed air and warmed primary air. The inlet door is mounted on the inlet port and selectively moveable between an open and a closed position to control primary air flow rate through the primary air flow passage, whereby primary air flow rate through the first heat exchanger is controlled to thereby control conditioned compressed air temperature.

In yet another exemplary embodiment, a method of supplying conditioned compressed air at a predetermined temperature to at least one section of an aircraft during ground support operations is provided. The method includes the steps of flowing compressed air through a first heat exchanger flow path and controlling primary air flow rate through an inlet port and a second heat exchanger flow path that cools the compressed air by selectively positioning at least one air inlet door that is mounted on the inlet port, whereby the predetermined temperature of the conditioned compressed air is controlled.

Other independent features and advantages of the preferred air conditioning system will become apparent from the following detailed description, taken in conjunction with the accompanying drawings which illustrate, by way of example, the principles of the invention.

DETAILED DESCRIPTION OF VARIOUS EMBODIMENTS

Figure 1:
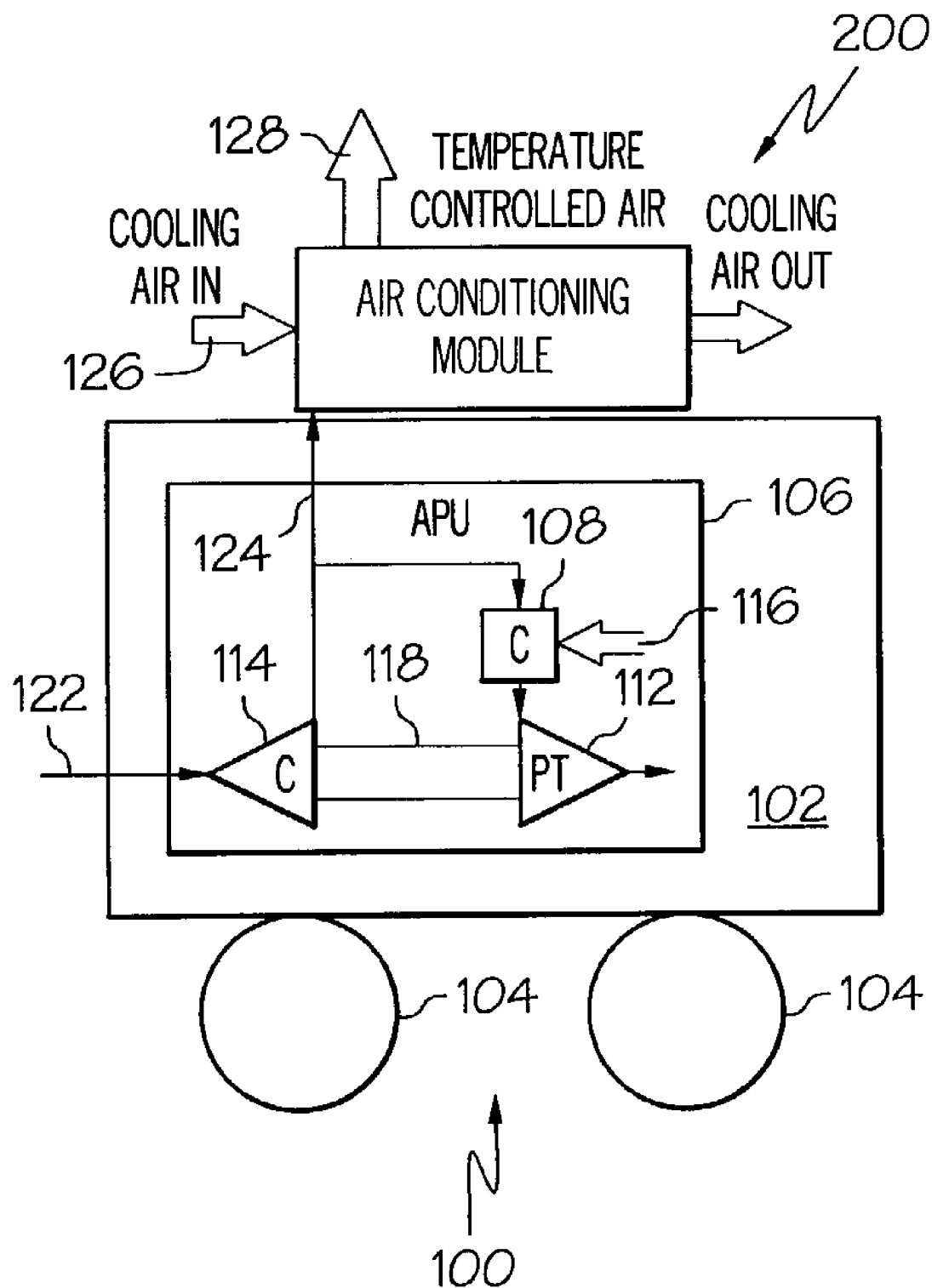
FIG. 1 is a simplified schematic diagram of a ground cart with a modular aircraft ground support air conditioning unit mounted thereon.

A simplified schematic representation of a ground cart 100 with a modular aircraft ground support air conditioning unit 200 mounted thereon is depicted in FIG. 1. The ground cart 100 includes a housing 102 and varying numbers of rotationally mounted wheels 104, which allow the cart 100 to be readily transported to one or more aircraft. Various systems and components may be mounted within the housing 102 to supply power and compressed air for ground support operations. In the depicted embodiment, an auxiliary power unit (APU) 106 is shown. It should be appreciated that other systems and components may also be installed in the ground cart 100, but for the sake of clarity and ease of description, only a single APU is depicted.

The general operation and configuration of turbine APUs is well-known in the industry. In the depicted embodiment, APU 106 includes a combustor 108, a power turbine 112, and a compressor 114. During APU operation, the combustor receives fuel 116 from a fuel source (not illustrated) and supplies high energy air to the power turbine 112 causing it to rotate. The power turbine 112 includes a shaft 118 that may be used to drive a generator (not illustrated) for supplying electrical power, and to drive the compressor 114. The compressor 114 draws in ambient air 122, compresses it, and supplies compressed air 124 to the air conditioning module 200. It should be appreciated that the present embodiment is not limited to use with an APU as the compressed air source, and that various other devices and systems for supplying compressed air to the air conditioning module 200 may also be used. For example, a diesel or other type of engine driving a compressor or other engine-compressor types, or any type of stationary compressor, may also be used to provide compressed air.

Figure 2:
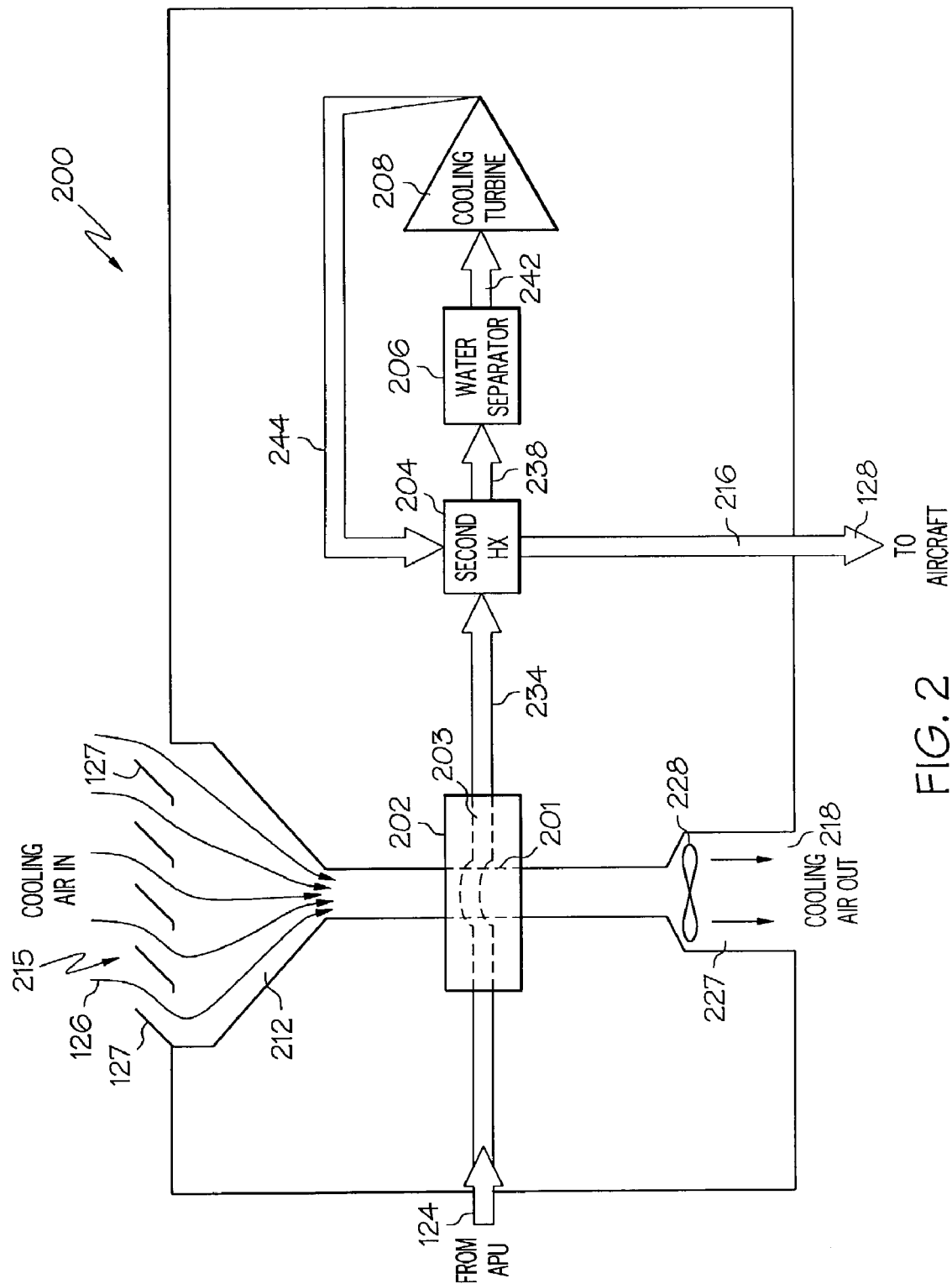
FIG. 2 is a schematic representation of an exemplary embodiment of a system according to an embodiment of the present invention that may be installed in modular air conditioning unit depicted in FIG. 1.

The air conditioning module 200 receives the compressed air 124 from the APU 106, and primary cooling air 126 from a source such as, for example, ambient air, that is drawn into and through the air conditioning module 200. The air conditioning module 200 functions to supply temperature-controlled air 128 to, for example, the environmental control system (ECS) in an aircraft. To accomplish this function, the air conditioning module 200, as depicted more clearly in schematic form in FIG. 2, includes a first heat exchanger 202, a second heat exchanger 204, a water separator 206, a cooling turbine 208, and a primary air flow passage 212.

The primary air flow passage 212 receives a flow of primary cooling air 126, via an inlet port 215, and exhausts a flow of warmed primary cooling air 227, via an outlet port 218. One or more flow control doors 127 are positioned in the inlet port 215. The flow control doors 127 are moveable and may thus be selectively positioned to control the flow of primary cooling air 126 through the primary air flow passage 212. In the depicted embodiment, a plurality of flow doors 127 are used to control primary air flow rate. It will be appreciated that the flow control doors 127 are not limited to doors, but may also be any one of numerous flow control components including, but not limited to, one or more gates, one or more dampers, or one or more moveable orifices, that may regulate the flow of primary cooling air 126 through the primary air flow passage 212. Moreover, a single flow control door 127 could be used rather than multiple doors, and the one or more flow control doors 127 could be positioned on the primary air flow passage outlet port 218.

A fan 228 draws the primary cooling air 126 into the air conditioning module 200 through the primary air flow passage 212. In the depicted embodiment, the fan 228 is positioned within the air conditioning module 200 to "pull" the uncompressed cooling air 126 through the first heat exchanger 202. It will be appreciated that the fan 228 could also be positioned within the air conditioning module 200 to "push" the uncompressed cooling air 126 through the first heat exchanger 202. Alternatively, the fan 228 may be eliminated if an outside power source is used to move air through the primary air flow passage 212.

The first heat exchanger 202 includes at least two flow paths. The first fluid flow path 201 is fluidly coupled in series in the primary air flow passage 212. The second fluid flow path 203 is coupled to receive the compressed air 124 supplied from the APU 106. As the primary cooling air 126 flows through the first fluid flow path 201, it cools the compressed air 124 as it flows through the second fluid flow path 203. Thus, the first heat exchanger 202 not only receives the primary cooling air 126 and the compressed air 124, it also supplies warmed primary cooling air 236 and conditioned compressed air 234.

The conditioned compressed air 234 that exits the first heat exchanger second flow path 203 is directed through the second heat exchanger 204. In the second heat exchanger 204, the conditioned compressed air 234 from the first heat exchanger 202 is further cooled by another flow of air. Specifically, air 244 that is exhausted from the cooling turbine 208 is also directed through the second heat exchanger 204, and is used to further cool the conditioned compressed air 234 from the first heat exchanger 202. The cooling turbine exhaust air that is warmed by the compressed air in the second heat exchanger 204 flows out the temperature-controlled air supply port 216, which supplies the temperature-controlled air 128 to, for example, an aircraft.

The further conditioned compressed air 238 flowing out of the second heat exchanger 204 may contain moisture. Therefore, this air is directed through the moisture separator 206. The moisture separator 206 may be any one of numerous devices known now, or provided in the future, for removing moisture from a flowing gas. In a particular preferred embodiment, the moisture separator 206 is the type that removes moisture by centrifugally separating free water droplets from the air flow, and exhausting the free water. Thereafter, the dry, further conditioned compressed air 242 that exits the moisture separator 206 is directed into the cooling turbine 208. This air 242 impinges upon rotating blades (not illustrated) in the cooling turbine 208, causing the blades to rotate. As the air impinges on the rotating blades, work is extracted from the air, cooling the air even further. As noted above, the air 244 exhausted from the cooling turbine 208 is then directed through the second heat exchanger 204 where it is warmed and directed out the temperature-controlled air outlet port 216, supplying the temperature-controlled air 128.

The temperature of the air that exits the temperature-controlled air outlet port 216 is determined by the temperature of the conditioned compressed air 234 that exits the first heat exchanger 202. Moreover, the temperature of the conditioned compressed air 234 can be controlled by controlling the flow of primary cooling air 126 through the first heat exchanger 202. The flow of primary cooling air 126 through the first heat exchanger 202 may in turn be controlled by controlling the flow of the primary cooling air 126 entering the inlet port 215, which may be controlled by selectively positioning various ones of the inlet doors 127. Hence, the temperature of the temperature-controlled air 128 exiting the outlet port 216 may be controlled by controlling the position of the air inlet doors 127.

Figure 3:
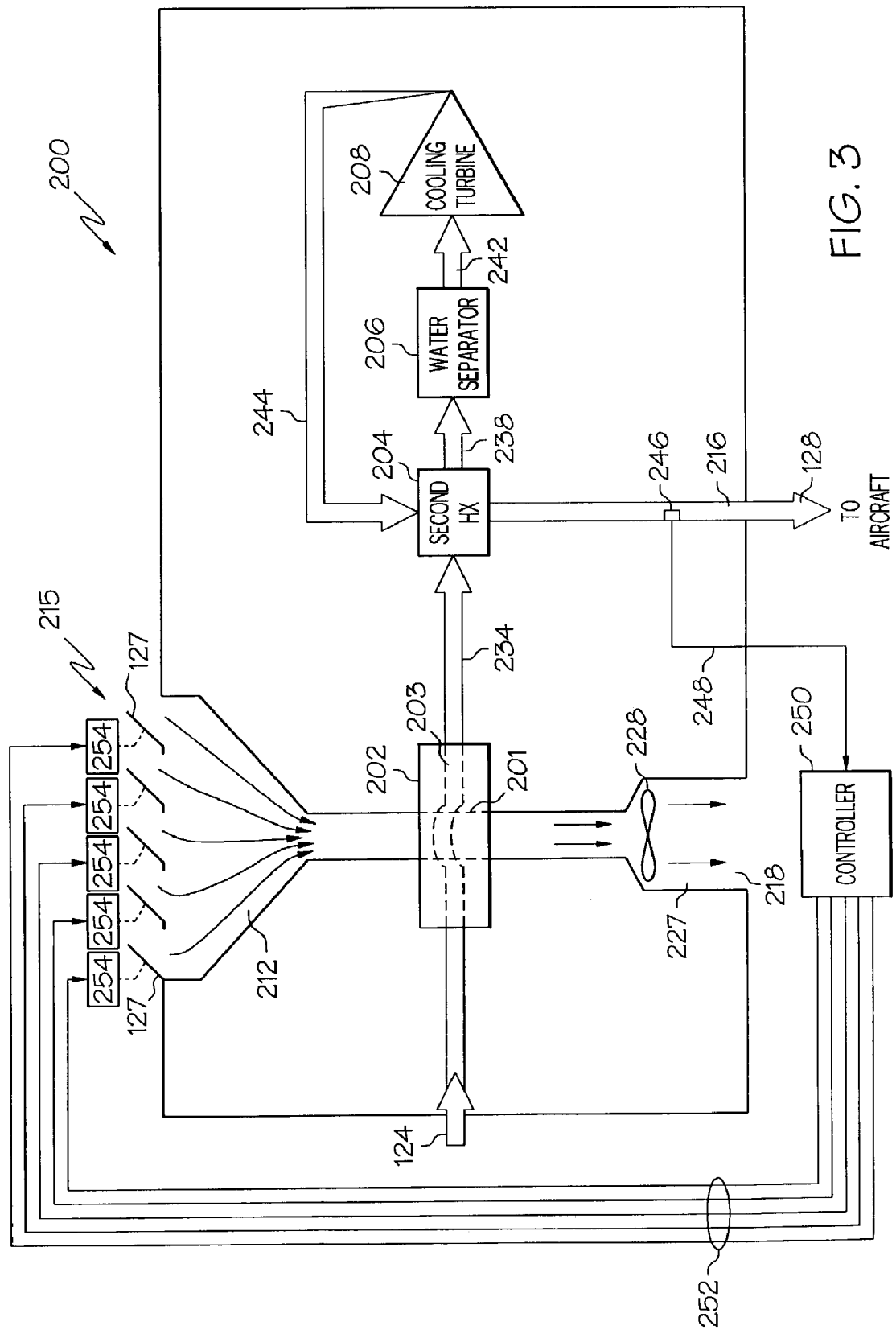
FIG. 3 is a schematic representation of an alternate embodiment of the system depicted in FIG. 2.

Various control schemes can be used to selectively position the air inlet doors 127, including various manual and automatic control schemes. In the embodiment depicted in FIG. 2, the inlet doors are selectively positioned manually. However, in the embodiment shown in FIG. 3, an automatic control scheme is used. With this embodiment, a temperature sensor 246 is positioned in the temperature-controlled air outlet port 216. The temperature sensor 246 may be any one of numerous sensors including, but not limited to, a capillary bulb temperature sensor, a resistance temperature detector (RTD), a thermocouple, or an optical temperature sensor. The temperature sensor 246 supplies a signal 248 representative of the temperature of the air 128 exiting the temperature-controlled air outlet port 216 to a controller 250. The controller 250 processes the temperature signal 248 and supplies one or more appropriate control signals 252 to one or more actuators 254 that are coupled to the inlet doors 127. The control signals 252 cause the actuators 254 to position the inlet doors 127, as necessary, so that the temperature of the air 128 exiting the temperature-controlled air outlet port 216 achieves the desired temperature.

It should be appreciated that the position of the temperature sensor 246 is not limited to the temperature-controlled air outlet port 216, but could instead be located in any one of numerous positions downstream of the first heat exchanger 202. For example, the temperature sensor 246 could be positioned so that it directly senses the temperature of the conditioned compressed air 234 exiting the first heat exchanger 202. It will be appreciated that in any one of the numerous positions, the temperature sensor 246 will supply a temperature signal representative of the temperature of the conditioned compressed air 234 exiting the first heat exchanger 202. It will additionally be appreciated that the inlet door actuators 254 could be any one of numerous types of actuators including, but not limited to, pneumatic, hydraulic, and electric. Various automatic control schemes may be used as needed for particular applications and configurations.

Figure 4:
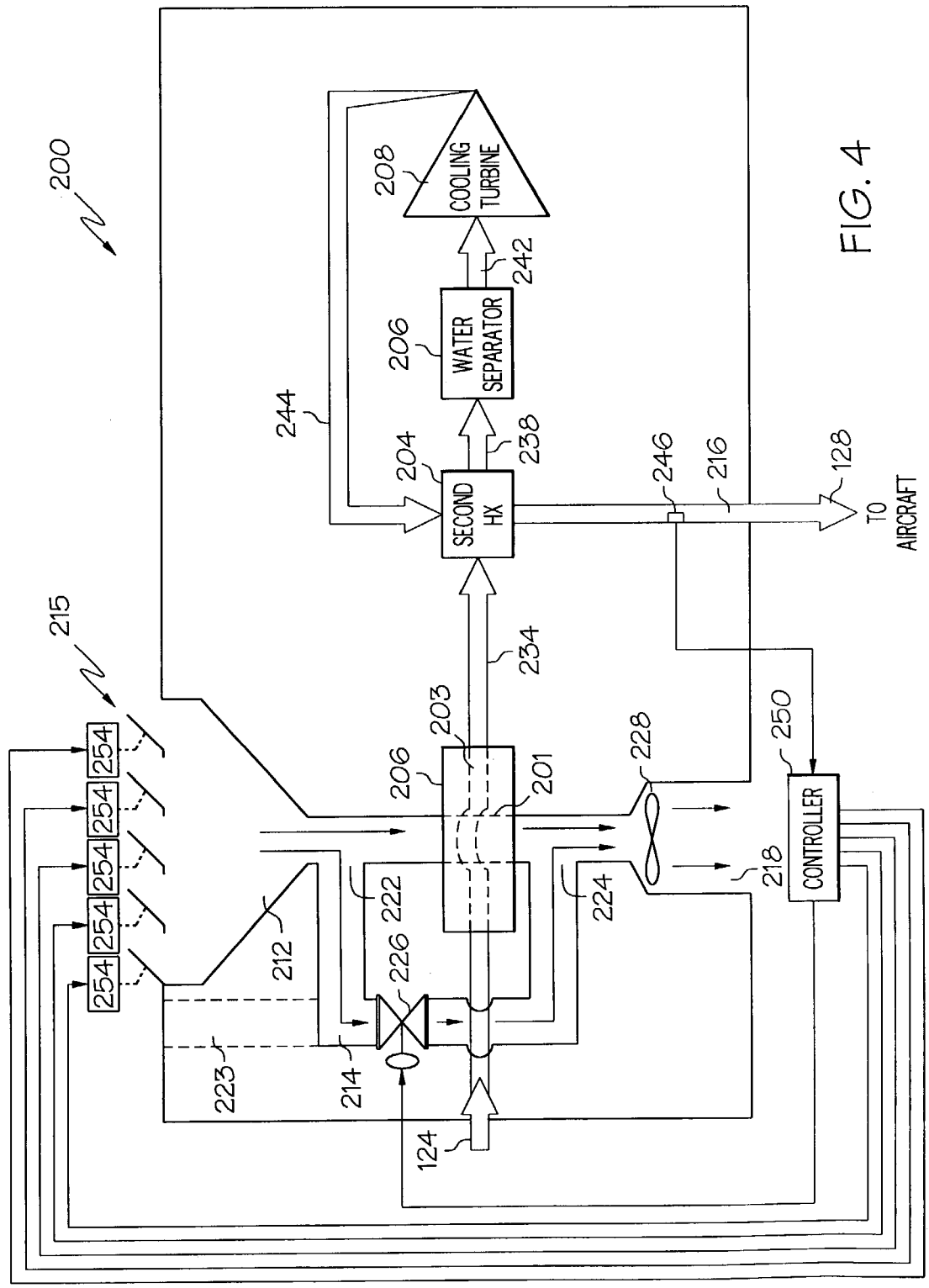
FIG. 4 is a schematic representation of another alternate embodiment of the system shown in FIG. 2.

In another alternative configuration, which is illustrated in FIG. 4, the air conditioning module may additionally include a bypass flow passage 214 that is fluidly coupled in parallel with the primary air flow passage 212. In the depicted embodiment, the bypass flow passage 214 includes an inlet port 222 in fluid communication with the primary air flow passage inlet port 215, and an outlet port 224 in fluid communication with the primary air flow passage outlet port 218. It will be appreciated that this configuration is only exemplary of a particular preferred embodiment, and that various other configurations can be used, including the one depicted in phantom in FIG. 4, in which an alternative bypass flow passage inlet 223 is in fluid communication with the source of the primary cooling air 126 may be used.

A bypass valve 226 is mounted on the bypass flow passage 214. The bypass valve 226 may be any one of numerous known valve designs presently known in the art, or developed in the future, but the presently preferred valve design is a butterfly valve. The bypass valve 226 is selectively moveable between a closed and an open position, and it may be positioned to further control the flow rate of primary cooling air 126 through the first heat exchanger 202. Similar to the air inlet doors 127, the bypass valve 226 may be positioned using various manual and automatic control schemes. In the depicted embodiment, an automatic control scheme is used, and the same controller 250 and temperature sensor 246 that are used to control the air inlet doors 127 are used to control the bypass valve 226. It will be appreciated, however, that a separate temperature sensor and controller could be used to control the bypass valve 226.

The air conditioning module 200 may be configured to operate in either a cooling mode or a heating mode. In the cooling mode, the air conditioning module 200 can supply conditioned compressed air at a temperature of about 55° F. or less, when ambient temperature is at or below 125° F. In the heating mode, the air conditioning module can supply conditioned compressed air at a temperature up to about 200° F., when ambient temperature is at or above approximately −40° F. In a particular preferred embodiment, the air inlet doors 127 remain in a full-open position when operating the air conditioning module 200 in the cooling mode, and are moved out of the full-open position, to control primary air flow when operating the air conditioning module 200 in the heating mode. In a particular preferred embodiment, primary air flow is controlled using a combination of both the air inlet doors 127 and the bypass valve 226. However, it should be appreciated that the air conditioning module 200 could be operated and configured such that the air inlet doors 127 are used to control primary air flow in either, or both, the cooling and heating modes, and with or without the bypass valve 226.

The temperature control system and method implemented in the air conditioning module allows the temperature of the air supplied by the module to be more precisely and more easily controlled, and to supply the air at temperatures of up to 200° F. when ambient temperature is as low as −40° F. In addition, because high temperature and/or pressure ductwork and valves are not needed, the system and method reduce the cost of the air conditioning module as compared to present configurations.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A temperature-controlled air supply system for use with an aircraft on the ground and for connection to a compressed air source, the air supply system comprising:

a primary air flow passage having at least an inlet port and an outlet port, the inlet port coupled to receive a flow of primary air;

a first heat exchanger having at least a first fluid flow path and a second fluid flow path, the first fluid flow path fluidly coupled in series with the primary air flow passage, the second flow path coupled to receive a flow of compressed air from the compressed air source, the first heat exchanger adapted to transfer heat between the primary air and the compressed air and supply at least conditioned compressed air;

a plurality of flow control doors mounted on the primary air flow passage, each flow control door independently moveable between an open position and a closed position to control primary air flow through the primary air flow passage, whereby primary air flow through the first heat exchanger is controlled to thereby control conditioned compressed air temperature;

a temperature sensor mounted downstream of the first heat exchanger second fluid flow path and operable to supply a temperature signal representative of the conditioned compressed air;

a controller coupled to receive the temperature signal from the temperature sensor and operable, in response thereto, to supply door control signals; and a plurality of door actuators coupled to receive the control signals and operable, in response thereto, to independently move the flow control doors to control primary air flow through the primary air flow passage.

2. The system of claim 1, further comprising:
a bypass flow passage fluidly coupled in parallel with the primary air flow passage; and
a bypass valve mounted on the bypass flow passage and selectively moveable between a closed and an open position to control primary air flow rate through the bypass flow passage, whereby primary air flow through the first heat exchanger is further controlled to thereby further control conditioned compressed air temperature.

3. The system of claim 2, wherein the controller is further responsive to the temperature signal to supply at least one valve control signal, and wherein the system further comprises:
at least one valve actuator coupled to receive the valve control signal and operable, in response thereto, to selectively move the bypass valve to control primary air flow through the bypass flow passage.

4. The system of claim 1, further comprising:
at least one cooling turbine having an air intake port and an air exhaust port; and
a second heat exchanger coupled to receive the conditioned compressed air from the first heat exchanger and turbine exhaust air from cooling turbine air exhaust port, and adapted to transfer heat from the conditioned compressed air to the cooled air exhausted from the cooling turbine and supply warmed turbine exhaust air and further conditioned compressed air.

5. The system of claim 4, wherein the cooling turbine air intake is coupled to receive the further conditioned compressed air from the second heat exchanger.

6. The system of claim 5, further comprising:
a moisture separator coupled between the second heat exchanger and the cooling turbine air intake.

7. The system of claim 1, further comprising:
a fan operable to draw the primary air from a primary air source into the primary air flow passage.

8. The system of claim 7, wherein the fan is configured to pull the primary air through the first heat exchanger.

9. The system of claim 7, wherein the fan is configured to push the primary air through the first heat exchanger.

10. The system of claim 1, wherein the primary air is ambient air.

11. A method of conditioning compressed air from an aircraft ground support equipment, the method comprising:
supplying a flow of compressed air through a first flow path in a heat exchanger;
supplying a flow of primary air through a plurality of independently actuated flow control doors and through a second flow path in the heat exchanger to thereby condition the compressed air to a desired temperature;
sensing a temperature that is representative of the conditioned compressed air; and
based on the sensed temperature, controlling primary air flow through the second flow path by independently actuating one or more of the flow control doors that are mounted in the second flow path, whereby the temperature of the conditioned compressed air is controlled.

12. The method of claim 11, further comprising:
selectively diverting a portion of the primary air away from the heat exchanger second flow path to further control primary air flow therethrough.

13. The method of claim 11, further comprising:
flowing the conditioned compressed air through a second heat exchanger; and
flowing cooling turbine exhaust air through the second heat exchanger to thereby further cool the conditioned compressed air and warm the turbine exhaust air.

14. The method of claim 13, further comprising:
supplying the warmed turbine exhaust air to the aircraft.

15. The method of claim 13, further comprising:
flowing the further cooled conditioned compressed air into an air intake of the cooling turbine.

16. The method of claim 11, further comprising:
supplying the primary air from ambient surroundings.

17. The method of claim 11, further comprising: supplying the compressed air from an auxiliary power unit (APU).

18. A temperature-controlled air supply system for use with an aircraft on the ground and for connection to a compressed air source, the air supply system comprising:
primary air flow means for receiving and supplying a flow of primary air, first heat exchanger means for (i) receiving the flow of primary air from the primary air flow means and a flow of compressed air from the compressed air source, (ii) transferring heat between the primary air and the compressed air and, (iii) supplying at least conditioned compressed air;
flow control means for controlling primary air flow through the primary air flow means, whereby primary air flow through the first heat exchanger means is controlled to thereby control conditioned compressed air temperature;
sensor means, mounted downstream of the first heat exchanger means, for supplying a temperature signal representative of the conditioned compressed air temperature;
controller means for (i) receiving the temperature signal and (ii) supplying door control signals; and
actuator means for (i) receiving the control signals and (ii) independently moving the flow control means to control primary air flow through the primary air flow means.

19. The system of claim 18 further comprising:
bypass flow means fluidly coupled in parallel with the primary air flow means for bypassing a portion of the primary air flow around the first heat exchanger means; and bypass valve means, mounted on the bypass flow means, for controlling primary air flow rate through the bypass flow means, whereby primary air flow through the first heat exchanger means is further controlled to thereby further control conditioned compressed air temperature.

20. The system of claim 19, wherein said controller means further supplies, upon receipt of the temperature signal, at least one valve control signal, and wherein the system further comprises:

valve actuator means for (i) receiving the valve control signal and (ii) selectively moving the bypass valve means to control primary air flow through the bypass flow means.

21. The system of claim 18, further comprising:

turbine means for supply turbine exhaust air; and second heat exchanger means for (i) receiving the conditioned compressed air from the first heat exchanger means and the turbine exhaust air from the turbine means, (ii) transferring heat from the conditioned compressed air to the turbine exhaust air, and (iii) supplying warmed turbine exhaust air and further conditioned compressed air.

22. The system of claim 21, wherein the turbine means receives the further conditioned compressed air from the second heat exchanger means.

23. The system of claim 22, further comprising:

moisture separation means, coupled between the second heat exchanger means and the turbine means, for removing moisture from the further conditioned compressed air.

24. The system of claim 18, further comprising:

fan means for flowing the primary air from a primary air source into the primary air flow means.

25. A temperature-controlled air supply system for use with a compressed air source and for connection to an aircraft on the ground, the air supply system comprising:

a primary air flow passage having at least an inlet port and an outlet port, the inlet port coupled to receive a flow of primary air;

a first heat exchanger having at least a first fluid flow path and a second fluid flow path, the first fluid flow path fluidly coupled in series with the primary air flow passage, the second flow path coupled to receive a flow of compressed air from the compressed air source, the first heat exchanger adapted to transfer heat between the primary air and the compressed air and supply at least conditioned compressed air;

a plurality of flow control doors mounted on the primary air flow passage, each flow control door independently moveable between an open position and a closed position to control primary air flow through the primary air flow passage, whereby primary air flow through the first heat exchanger is controlled to thereby control conditioned compressed air temperature;

a bypass flow passage fluidly coupled in parallel with the primary air flow passage;

a bypass valve mounted on the bypass flow passage and selectively moveable between a closed and an open position to control primary air flow rate through the bypass flow passage, whereby primary air flow through the first heat is exchanger is further controlled to thereby further control conditioned compressed air temperature;

a second heat exchanger coupled to receive the conditioned compressed air from the first heat exchanger and turbine exhaust air from a cooling turbine, and adapted to transfer heat from the conditioned compressed air to the turbine exhaust air and supply warmed turbine exhaust air and further conditioned compressed air;

at least one cooling turbine having an air intake in fluid communication with the second heat exchanger to receive therefrom the further conditioned compressed air and an air exhaust in fluid communication with the second heat exchanger to supply thereto the turbine exhaust air;

a moisture separator coupled between the second heat exchanger and the cooling turbine air intake; and a fan operable to draw the primary air from the primary air source into the primary air flow passage.

* * * * *